United States Patent
Doya

(10) Patent No.: US 7,170,495 B2
(45) Date of Patent: Jan. 30, 2007

(54) KEY INPUT DEVICE

(75) Inventor: Kenji Doya, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 401 days.

(21) Appl. No.: 10/483,007

(22) PCT Filed: Mar. 5, 2003

(86) PCT No.: PCT/JP03/02606

§ 371 (c)(1),
(2), (4) Date: Jan. 5, 2004

(87) PCT Pub. No.: WO03/077103

PCT Pub. Date: Sep. 18, 2003

(65) Prior Publication Data

US 2004/0178992 A1 Sep. 16, 2004

(30) Foreign Application Priority Data

Mar. 12, 2002 (JP) ............................. 2002-066846

(51) Int. Cl.
*G09G 5/00* (2006.01)

(52) U.S. Cl. ...................... 345/168; 345/169; 345/171; 345/172

(58) Field of Classification Search ................ 345/168, 345/169, 171, 172
See application file for complete search history.

(56) References Cited

U.S. PATENT DOCUMENTS

2005/0253814 A1* 11/2005 Ghassabian ................ 345/168

* cited by examiner

*Primary Examiner*—Bipin Shalwala
*Assistant Examiner*—Leonid Shapiro
(74) *Attorney, Agent, or Firm*—Gerald T. Bodner

(57) ABSTRACT

A key inputting device includes a vowel switch for inputting vowels, and consonant switches for inputting consonants. The vowel switch is displacable in five directions, each consonant switch is displacable in three directions, and displacement directions of each switch are allotted to each letter of alphabet corresponding to at least a movement of articulatory organs when pronouncing each letter, that is, a movement or a location of a jaw, a throat, a tongue, lips. The vowel switch is operationable by a thumb, and the consonant switches are operationable by an index finger, a middle finger, a ring finger, and a little finger, respectively.

8 Claims, 2 Drawing Sheets

| FINGER | LITTLE FINGER | LITTLE FINGER + RING FINGER | RING FINGER | RING FINGER + MIDDLE FINGER | MIDDLE FINGER | MIDDLE FINGER + INDEX FINGER | INDEX FINGER |
|---|---|---|---|---|---|---|---|
| SWITCH DIRECTION | S5 | S5+S4 | S4 | S4+S3 | S3 | S3+S2 | S2 |
| I | q | h | r | n | l | w | m |
| II | x | g | j | z | d | v | b |
| III | c | k | y | s | t | f | p |

KEY INPUT DEVICE

TECHNICAL FIELD

The present invention relates to a key inputting device. More specifically, the present invention relates to a key inputting device capable of at least inputting a letter, and used for a computer keyboard, an operation key of a handheld terminal, and etc.

PRIOR ART

In a key inputting device of such the kind of the prior art, as is represented by a mobile telephone, an alphabet, a kana (Japanese syllabary), and etc. are allotted to each key of a ten-key for minimizing an apparatus. A user changes an inputting mode, for example, so as to input a letter such as the alphabet, the kana, a katakana (square form of the kana) or numbers.

In addition, in a handheld terminal such as a PDA, an electronic notebook, and etc., it is possible to input the letter by a stylus pen, and reduce the number of the keys for inputting the letter. This allows to render the terminal itself small to a certain degree, hence an advantage.

However, of the prior arts, in the former, although it is possible to input a desired letter by depressing the ten-key, for example, there are a plurality of letters allotted to one key, and therefore, it is needed to depress the same key for a plural number of times when inputting the desired letter. That is, the operation is troublesome, and takes time to input the letter.

On the other hand, in the latter, a troublesome key inputting is almost not required as in the former. It, however, took time to recognize a hand-written letter, and is highly probable to make an error in recognizing the letter. Thus, it takes time to confirm and correct a recognizing result. Furthermore, it is necessary to memorize a special letter system for the inputting, and master the skill, too. In addition, in order to input the letter, it is needed to hold (support) the handheld terminal with one hand, and hold a pen with the other hand, thus the both hands are occupied. This leads to a problem that a user who carries a luggage is hindered from operating the handheld terminal when the user stays outdoors. As a result, the operation becomes troublesome.

SUMMARY OF THE INVENTION

Therefore, it is a primary object of the present invention to provide a novel key inputting device.

It is another object of the present invention to provide a key inputting device easy to master, and operationable at a high speed.

The present invention is a key inputting device provided with a plurality of switches for inputting a plurality of letters, and capable of at least inputting the letter by operating one, or two or more switches. Each of the plurality of switches is displacable in a plurality of directions, and displacement directions of each switch are allotted to the direction at least determined by a movement of articulatory organs at a time of pronouncing each letter.

The key inputting device is provided with a plurality of switches for inputting a plurality of letters. A vowel switch for inputting a vowel and consonant switches for inputting consonants are provided, for example. Each of a plurality of such the switches is displacable in a plurality of directions, and a relationship between each displacement direction of each switch and letter inputtable by the displacement direction is determined in correspondence with at least a movement or a position of the articulatory organs at a time of pronouncing each letter, that is, movements of a jaw, a throat, a tongue, or lips.

In addition, if it is rendered possible to operate the vowel switch by a thumb, and the consonant switches by an index finger, a middle finger, a ring finger and a little finger, it becomes possible to input a desired letter by a single hand.

A letter alignment of the vowel switch is determined in correspondence with a movement of articulatory organs at a time of pronouncing a vowel letter, for example. In addition, a letter alignment of the consonant switch is determined in correspondence with a movement of the articulatory organs at a time of pronouncing a sound (letter) different from the vowel, and a generating location of the consonant between a tongue and lips.

Thus, a relationship between the displacement directions of each switch and the input letter is determined in correspondence with the movement of the articulatory organs so that, even when forgetting the switch for inputting the desired letter, it is still possible to easily know the switch to be operated from the movement of the articulatory organs. In addition, areas controlling responsible for sensation and movement of a mouth and a hand are adjacent to each other in the human brain, and by describing a phonogram by a movement of a finger that retains a topographic relationship with the movement of the mouth (articulatory organs) at a time of pronunciation, it becomes possible to quickly master (learn) a movement expression in a body coordinate.

According to the invention, the relationship between the displacement directions of each switch and the input letter corresponds at least to the movement of the articulatory organs at a time of pronunciation. This enables to easily remember the relationship, and master an inputting-operation method in a short period of time. In addition, it is possible to easily input by a single hand, thus possible to input at a high speed.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
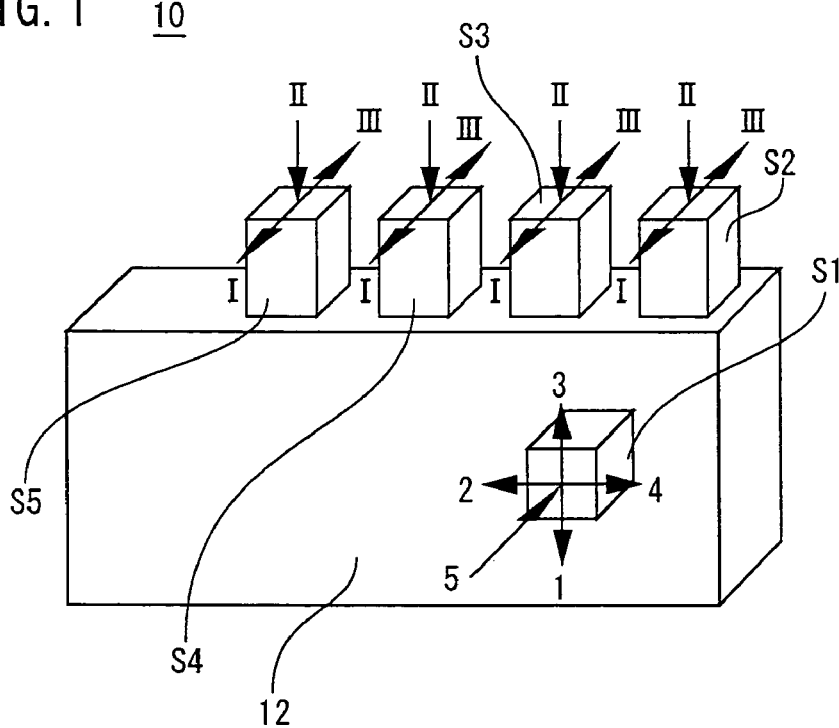
FIG. 1 is an illustrative view showing a key inputting device of one embodiment of the present invention.

Referring to FIG. 1, a key inputting device 10 of this embodiment includes a main body 12, and switches S1, S2, S3, S4, and S5 are provided in the main body 12. As understood from FIG. 1, the switch S1 is arranged on a side surface different from the other switches S2–S5, and the S2–S5 are arranged and aligned in a row on the same side surface.

As indicated by arrows (1)–(5) in FIG. 1, the switch S1 is a switch displacable (operationable) in five directions, and therefore, the switch is capable of inputting five different pieces of information (in this embodiment, letter).

Furthermore, as indicated by arrows in FIG. 1, the switches S2–S5 are switches operationable in three directions, and therefore, the switches are capable of inputting three different letters.

Inputtable letters (in this embodiment, alphabet) are allotted to each of the switches S1–S5, for example. It is noted that detailed descriptions will be given later, and an allotment (letter alignment or alignment) is determined based on a movement or a position of articulatory organs, that is, a jaw, a throat, a tongue, a mouth in a case of delivering (pronouncing) the vowel or other sounds except the vowel.

Furthermore, the key inputting device 10 shown in FIG. 1 is a device for inputting the letter by using a right hand, and the device 10 is held by the right hand. More specifically, the switch S1 is a switch operated by a thumb, the switch S2 is a switch operated by an index finger, the switch S3 is a switch operated by a middle finger, the switch S4 is a switch operated by a ring finger, and the switch S5 is a switch operated by a little finger.

Alphabets of "a", "i", "u", "e", and "o" are allotted to the switch S1. That is, the switch S1 is a switch capable of inputting the vowel (vowel switch). The alignment or arrangement of the five alphabets is determined in correspondence with a movement of the jaw and the tongue of people when pronouncing the vowel letter, for example.

Figure 2:
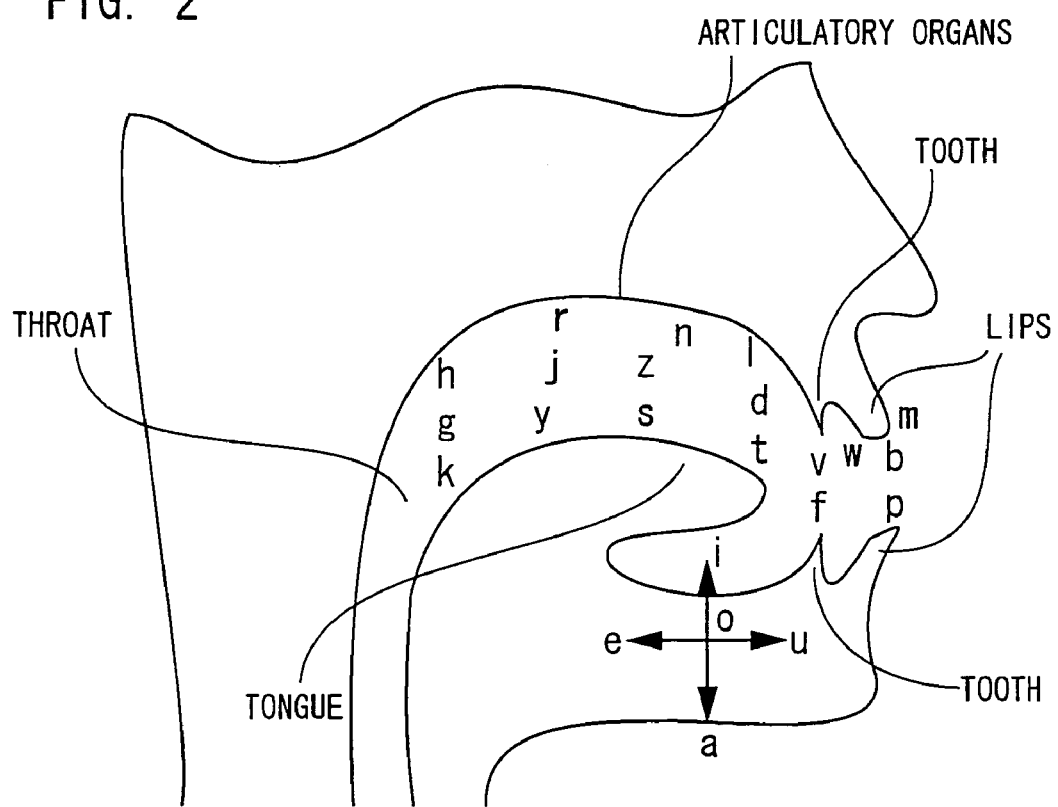
FIG. 2 is an illustrative view showing an arrangement of vowels and consonants corresponding to a movement of articulatory organs in a case of pronouncing vowels and other sounds except the vowels.

As shown in FIG. 2, in a case that a person pronounces the vowel, and the position of the jaw and the tongue is considered the center of a case of pronouncing "o", when pronouncing "i", the jaw and the tongue are moved to an upper position (near the roof of mouth) than the position of pronouncing "o". Furthermore, in a case of pronouncing "a", contrary to the case of pronouncing "i", the position of the jaw and the tongue is moved to a lower position (far from the roof of mouth) than in a case of pronouncing "o". In addition, in a case of pronouncing "u", the position of the jaw and the tongue is moved to a forward position (lips side) than in a case of pronouncing "o". Still furthermore, in a case of pronouncing "e", the position of the jaw and the tongue is moved to a backward position (throat side) than in a case of pronouncing "o".

Figures 3, 4:
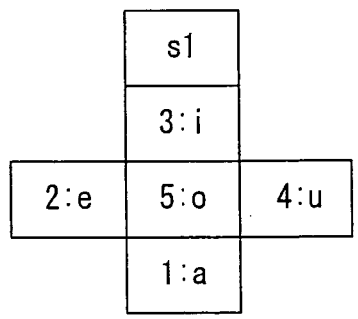
FIG. 3 is a table showing an operating direction of a vowel switch and an alphabet to be input corresponding thereto in the FIG. 1 embodiment.
FIG. 4 is a table showing a relationship between consonant switches and consonants input thereby in FIG. 1 embodiment.

Therefore, as shown in FIG. 3, in this embodiment, letters (alphabets) are allotted to the switch S1, that is, "a" is allotted in a (1) direction, "e" in a (2) direction, "i" in a (3) direction, "u" in a (4) direction, and "o" in a (5) direction as shown in FIG. 1, respectively.

It is noted that in FIG. 3, numerals indicating an operating direction of the switch S1 are written on the left side, and the alphabets to be input corresponding thereto are written on the right side of the numerals.

On the other hand, in a case of pronouncing a sound (letter) except the vowel, a generating location of the consonant is aligned or arranged as shown in FIG. 2. Herein, the consonant is a sound generated as a result of a breath that a human exhales being stricken against or come into conflict with the lips, teeth, the tongue, and etc., and the generating location differs in space between the tongue and the lips depending upon the sound to be pronounced. The sound of m, b, and p is generated as a result of the lips being shut, and that of w, v, and f is generated as a result of the lips being narrowed, for example. Furthermore, the sound of l, d, t, and n is generated as a result of an end of the tongue touching the roof of the mouth, and that of z, and s is generated as result of the end of the tongue approaching the roof of the mouth. In addition, the sound of r, j, and y is generated as a result of a center portion of the tongue approaching the roof of the mouth, that of h is generated as a result of a back of the tongue approaching the throat, and that of g, and k is generated as a result of the back of the tongue approaching the throat.

Furthermore, even in the same or approximately same generating location, it is possible to distinguish the consonant by whether or not a respiratory passage is completely closed. In addition, it is even possible to divide into an unvoiced sound and voiced sound. In this embodiment, regarding the alignment of the consonants shown in FIG. 2, the generating location of the alphabet shown to be vertically aligned is the same or approximately same, and even in the same generating location, the alphabets shown in the center are the voiced sounds, and the alphabets shown in the lower side are the unvoiced sounds corresponding thereto. Furthermore, the alphabets shown in the upper side are the consonants other than the above.

As a rule, the consonants are aligned according to such the principle, and there are, however, some portions where the alignment does not necessarily comply with this principle.

It is noted that the alignment of the vowels and the consonants (letter alignment) shown in FIG. 2 is empirically obtained by the inventor of the present invention et al. through an experiment, and others.

The alignment of the consonants shown in FIG. 2 is allotted to the switches S2–S5, and by operating at least more than one switches of S2–S5, it becomes possible to input the alphabets except the alphabets of "a", "i", "u", "e" and "o". That is, the switches S2–S5 are switches capable of inputting the consonant (consonant switch). Furthermore, such the alignment of the consonants is shown as in FIG. 4 based on FIG. 2.

Herein, as understood from FIG. 2 and FIG. 4, there are approximately six generating locations of the consonants, and therefore, it is not possible to allot one switch corresponding to one generating location. Thus, in this embodiment, by adopting an operating method of simultaneously operating adjacent two switches, the letter alignment of the consonants corresponding to the generating locations is allotted to the switches S2–S5 (including S2+S3, S3+S4, S4+S5).

It is noted that regarding the alphabets "q", "x", and "c", its pronunciation is so special that as shown in FIG. 2, it is not possible to display (specify) the alignment as other alphabets. Therefore, these alphabets are allotted to the switch S5.

Returning to FIG. 1, in the switch S2, a letter of "m" is allotted in the direction of (I), "b" in the direction of (II), and "p" in the direction of (III). Furthermore, in the switch S3, a letter of "l" is allotted in the direction of (I), "d" in the direction of (II), and "t" in the direction of (III). Moreover, in the switch S4, a letter of "r" is allotted in the direction of (I), "j" in the direction of (II), and "y" in the direction of (III). In addition, in the switch S5, a letter of "q" is allotted in the direction of (I), "x" in the direction of (II), and "c" in the direction of (III).

Furthermore, in a case that both the switch S2 and the switch S3 (S2+S3) are simultaneously operated, a letter "w" is allotted in the direction of (I), a letter "b" in the direction (II), and a letter "p" in the direction (III), respectively. Likewise, in a case that both the switch S3 and the switch S4 (S3+S4) are operated at the same time, a letter "n" is allotted in the direction (I), a letter "z" in the direction (II), and a letter "s" in the direction (III), respectively. Furthermore, in a case that both the switch S4 and the switch S5 (S4+S5) are simultaneously operated, a letter "h" is allotted in the direction (I), a letter "g" in the direction (II), and a letter "k" in the direction (III), respectively.

It is noted that in this embodiment, in a case that two switches are operated at the same time, the two switches are displaced (operated) in the same direction.

In a case that the key inputting device 10 of this embodiment is used, for example, it is possible to input the alphabet and kana (a Japanese syllabary), or katakana (a square form of the kana). In a case of inputting the alphabet, the letters are arranged as shown in FIG. 3 and FIG. 4 so that one of the switches S1–S5 corresponding to the desired alphabet may be selected and operated in a predetermined direction. Therefore, in a case of inputting "dog", the switch S3 may be operated in the direction (I), the switch S1 may be operated in the direction (II), and the switch S4 and the switch S5 may be operated in the direction (III).

At this time, even in a case of forgetting to which direction which switch is operated in order to input the desired alphabet, it is possible to easily know the direction by a movement (location) of the articulatory organs (jaw, throat, tongue, lips) when pronouncing (delivering) the alphabet (in a case of the consonant, the letter including the alphabet).

Furthermore, areas for controlling responsible for sensation and a movement of a mouth and a hand are adjacent to each other in the brain, and therefore, by expressing a phonogram by a movement of the finger having a balanced phase relationship with the movement of the mouth (articulatory organs) when delivering a sound, it is possible to quickly master (learn) a movement expression in a body coordinate.

In addition, in a case of inputting the kana and the katakana, a Roman alphabet inputting method, in which a Japanese letter is input in accordance with the Roman alphabet, is adopted in this embodiment. Therefore, in a case of inputting "inu" (dog in English), for example, it is necessary to input "inu" in alphabet. More specifically, the switch S1 may be operated in the (3) direction, the switch S3 and the switch S4 may be operated in the (I) direction, and the switch S1 may be operated in the (4) direction.

In this case, too, similar to the above, even in a case of forgetting in which direction which switch is operated in order to input the desired alphabet, it is possible to easily know the direction by the movement of the articulatory organs when delivering the alphabet (in a case of the consonant, the letter including the alphabet).

It is noted that in a case of the Roman alphabet inputting method, it is also possible to input the consonant and the vowel at the same time. That is, in a case of inputting "inu", after operating the switch S1 in the (3) direction, the switch S3 and the switch S4 are operated in the (I) direction. At the same time, the switch S1 may be operated in the (4) direction. In this case, compared to a case of inputting the alphabet one by one, it is possible to input at a high speed.

It is noted that the inputting mode such as the alphabet inputting, the kana inputting, the katakana inputting as described above may be selected (switched) in an apparatus (equipment) to which this key inputting device 10 is applied, that is, a computer such as a notebook computer, or a handheld terminal such as a mobile phone, a PDA, and etc.

Furthermore, it is shown in this embodiment that inputtable information (letter) is limited to only 26 letters in alphabet. However, there are various operating (inputting) methods using at least more than two switches of S2–S5, and therefore, a numeral and an index, too, may be input like a keyboard attached to a computer. In addition, it may be considered to input a function such as a switching of the inputting mode, a Chinese character-to-Japanese character conversion, and etc.

When the switch S2 is operated in the (I) direction, and at the same time, the switch S3 is operated in the (III) direction, for example, it is possible to input ">", for example. On the contrary, when the switch S2 is operated in the (III) direction, and at the same time, the switch S3 is operated in the (I) direction, it is possible to input "<", for example.

In addition, in a case of the kana inputting mode, when the switch S2, the switch S3, and the switch S4 are simultaneously operated in the (II) direction after inputting the kana, it is also possible to convert the kana (Japanese syllabary) into kanji (Chinese character) or katakana (square form of the kana).

Furthermore, the selection (change) of the inputting mode such as the alphabet inputting, the kana inputting, the katakana inputting, and etc. as described above may be executed by operating the switches S2–S5 at the same time. By operating the switches S2–S5 in the (II) direction at the same time, for example, it is possible to select in order (sequentially) such as in the order of the alphabet inputting, the kana inputting, the katakana inputting, the alphabet, . . . . In addition, by operating the switches S2–S5 in the (I) direction, it is also possible to select the alphabet inputting, and by operating in the (II) direction at the same time, it is also possible to select the kana inputting. Furthermore, by operating in the (III) direction at the same time, it is also possible to select the katakana inputting.

It is noted that regarding such the index, the numeral, the function, and the mode change, it is arbitrary to allot the switch, and this is freely determined by a designer, and et al.

Furthermore, in addition to the inputtings such as the letter, the index, the numeral, the function, and the mode change as described above, it is also possible to delete (clear, backspace) a letter once input, and etc. by a function that combines more than two of the switches S2–S5 a letter, and etc. that are once input.

Furthermore, although a detailed description is omitted in this embodiment, the key inputting device 10 includes a key encoder (not shown), and the text information determined corresponding to the function of the switches S1–S5 may be transferred from the key encoder to an apparatus to which the key inputting device 10 is applied. In addition, it may be possible that an operating signal itself corresponding to the function of the switches S1–S5 is transferred to such the apparatus, and converted (encoded) into the text information on a device side.

According to this embodiment, the letter arrangement of the switches (displacing direction) corresponds to at least the movement of the articulatory organs at a time of pronunciation of each letter (vowel and consonant). Therefore, it is possible to easily remember, and master the inputting operation in a short period of time. In addition, it is possible to input with a single hand, thus possible to input at a high speed. Furthermore, one of the two hands is always not occupied. In addition, the device may be formed in such a manner as to be small enough to be held by one hand so that it is possible to render the device quite small, compared to a conventional keyboard used for a computer, and etc., and minimize the apparatus itself to which this key inputting device is adapted.

It is noted that in this embodiment, although the key inputting device is illustrated and described in a case of being operated by the right hand, it is possible to form a key inputting device of a case of being operated by the left hand. Simply described, the key inputting device 10 shown in FIG. 1 may be formed in a plane symmetry manner, rendering the center a surface parallel to a side surface of the main body 12 on which the switches S2–S4 are arranged.

In addition, in this embodiment, although the main body 12 of the key inputting device 10 is shown by a simple quadratic prism, the body 12 may be formed in a such a form easily to be held by a (right) hand. Similarly, the switches S1–S5 may be formed in a manner that its movable portion is easily operated by a finger. To the switches S2–S5, it is considered to adapt a switch such as a so-called jog dial, for example.

Furthermore, in this embodiment, although only the key inputting device is described, such the key inputting device is adaptable to a computer, a handheld terminal, and etc. In addition, if ingenuity is given to a handling of input information (alphabet), this device is also usable as an interface of a game machine, an electric music instrument, and etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A key inputting device provided with a plurality of switches for inputting a plurality of letters, and capable of at least inputting the letter by operating one, or two or more switches, wherein
    each of said plurality of switches is displacable in a plurality of directions, and displacement directions of each switch are allotted to directions at least determined by a movement of articulatory organs at a time of pronouncing each letter, and wherein
    said plurality of switches include one vowel switch for inputting vowels, and a plurality of consonant switches for inputting consonants,
    said vowel switch is displacable in five directions, and each direction is allotted to vowels respectively different with each other, and
    each of said consonant switches is displacable at least in three directions, and each direction is allotted to consonants respectively different with each other.

2. A key inputting device according to claim 1, wherein
    said vowel switch is provided in such a manner as to be operated by a thumb, and
    said plurality of consonant switches are provided in such a manner as to be operated by at least one or more of an index finger, a middle finger, a ring finger, and a little finger.

3. A key inputting device according to claim 1, wherein a relationship between the displacement directions of said vowel switch and the vowels corresponding thereto is determined in correspondence with a movement of articulatory organs when pronouncing each vowel.

4. A key inputting device according to claim 1, wherein a relationship between each displacement direction of said plurality of consonant switches and the consonant corresponding thereto is determined in correspondence with a movement of articulatory organs when pronouncing the consonant and a generating location of said consonant between a tongue and lips.

5. A key inputting device according to claim 2, wherein a relationship between the displacement directions of said vowel switch and the vowels corresponding thereto is determined in correspondence with a movement of articulatory organs when pronouncing each vowel.

6. A key inputting device according to claim 2, wherein a relationship between each displacement direction of said plurality of consonant switches and the consonant corresponding thereto is determined in correspondence with a movement of articulatory organs when pronouncing the consonant and a generating location of said consonant between a tongue and lips.

7. A key inputting device according to claim 3, wherein a relationship between each displacement direction of said plurality of consonant switches and the consonant corresponding thereto is determined in correspondence with a movement of articulatory organs when pronouncing the consonant and a generating location of said consonant between a tongue and lips.

8. A key inputting device according to claim 5, wherein a relationship between each displacement direction of said plurality of consonant switches and the consonant corresponding thereto is determined in correspondence with a movement of articulatory organs when pronouncing the consonant and a generating location of said consonant between a tongue and lips.

* * * * *